(12) United States Patent
DeBartolo et al.

(10) Patent No.: US 10,181,709 B2
(45) Date of Patent: *Jan. 15, 2019

(54) FLOOR BOX ASSEMBLY WITH RETAINER

(71) Applicant: Hubbell Incorporated, Shelton, CT (US)

(72) Inventors: Joseph V. DeBartolo, North Stonington, CT (US); Sorin I. Mortun, Irvington, NY (US); Emircan M. Dumani, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,684

(22) Filed: Feb. 20, 2018

(65) Prior Publication Data

US 2018/0175601 A1 Jun. 21, 2018

Related U.S. Application Data

(63) Continuation of application No. 15/243,261, filed on Aug. 22, 2016, now Pat. No. 9,912,134.

(60) Provisional application No. 62/209,715, filed on Aug. 25, 2015.

(51) Int. Cl.
  *H02G 3/18* (2006.01)
  *H02G 3/12* (2006.01)

(52) U.S. Cl.
  CPC .............. *H02G 3/185* (2013.01); *H02G 3/12* (2013.01)

(58) Field of Classification Search
  CPC .................................. H02G 3/12; H02G 3/185
  USPC ......................................................... 174/488
  See application file for complete search history.

(56) References Cited

U.S. PATENT DOCUMENTS

| 4,331,832 | A | 5/1982 | Curtis |
| 5,705,772 | A | 1/1998 | Brown |
| 7,259,337 | B1 * | 8/2007 | Gretz .................... H02G 3/06 174/481 |
| 7,271,351 | B2 * | 9/2007 | Drane .................... H02G 3/185 174/482 |
| 7,989,710 | B2 | 8/2011 | Hansen |
| 8,878,058 | B2 | 11/2014 | Wurms |

* cited by examiner

*Primary Examiner* — Dhirubhai R Patel
(74) *Attorney, Agent, or Firm* — Michael Best & Friedrich, LLP

(57) ABSTRACT

A floor box assembly includes a floor box and at least one retainer coupled to the floor box. The floor box includes an outer wall extending along a longitudinal axis, and the outer wall includes a first end and a second end. The first end is configured to be coupled to an electrical receptacle. The floor box is configured to receive at least one cable in electrical communication with the receptacle. The retainer permits the floor box to be inserted in a first direction along the longitudinal axis and secures the floor box against movement in a second direction opposite the first direction.

20 Claims, 6 Drawing Sheets

FLOOR BOX ASSEMBLY WITH RETAINER

CROSS-REFERENCE TO RELATED APPLICATION

This application is a continuation of U.S. patent application Ser. No. 15/243,261 now U.S. Pat. No. 9,912,134 filed Aug. 22, 2016, which claims the benefit of prior-filed U.S. Provisional Patent Application No. 62/209,715, filed Aug. 25, 2015. The entire contents of these applications are incorporated by reference herein.

BACKGROUND

This disclosure relates generally to a floor box for housing electrical power and/or low voltage (data, multi-media, A/V & communications) devices. More particularly, the device relates to a floor box for accommodating electrical power and data distribution devices within a floor.

Conventional in-floor boxes for routing electrical power and communication conduit are often used in commercial buildings and the like. In some circumstances, the height of the box is fixed, although the final height of the floor may be different from the height of the box. As a result, the floor box may protrude from the floor or require a means of propping up the floor box. In addition, the floor box may be susceptible to being pulled out of the floor unless the box is secured in place.

SUMMARY

In one aspect, a floor box assembly includes a floor box and at least one retainer coupled to the floor box. The floor box includes an outer wall extending along a longitudinal axis, and the outer wall includes a first end and a second end. The first end is configured to be coupled to an electrical receptacle. The floor box is configured to receive at least one cable in electrical communication with the receptacle. The at least one retainer permits the floor box to be inserted a first direction along the longitudinal axis and secures the floor box against movement in a second direction opposite the first direction.

In another aspect, a floor box assembly includes a floor box, a first retainer, and a second retainer. The floor box includes an outer wall extending along a longitudinal axis, and the outer wall defines a first end and a second end. The first end is configured to be coupled to an electrical receptacle. The floor box is configured to receive at least one cable in electrical communication with the receptacle. The first retainer includes a first barb extending outwardly relative to the longitudinal axis. The second retainer includes a second barb extending outwardly relative to the longitudinal axis.

In yet another aspect, a method of installing a floor box assembly includes: providing a floor box having an outer wall and a retainer secured to the outer wall, the retainer including a plurality of tapered barbs, at least some of the plurality of barbs aligned along an axis; and inserting the floor box and retainer into a hole of a surface in a first direction parallel to the axis such that the barbs engage a perimeter of the hole to secure the floor box against movement in a second direction opposite the first direction.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

As used herein "substantially", "generally", and other words of degree, are used as a relative modifier intended to indicate permissible variation from the characteristic so modified. It is not intended to be limited to the absolute value or characteristic, which it modifies but rather approaching or approximating such a physical or functional characteristic.

Figure 1:
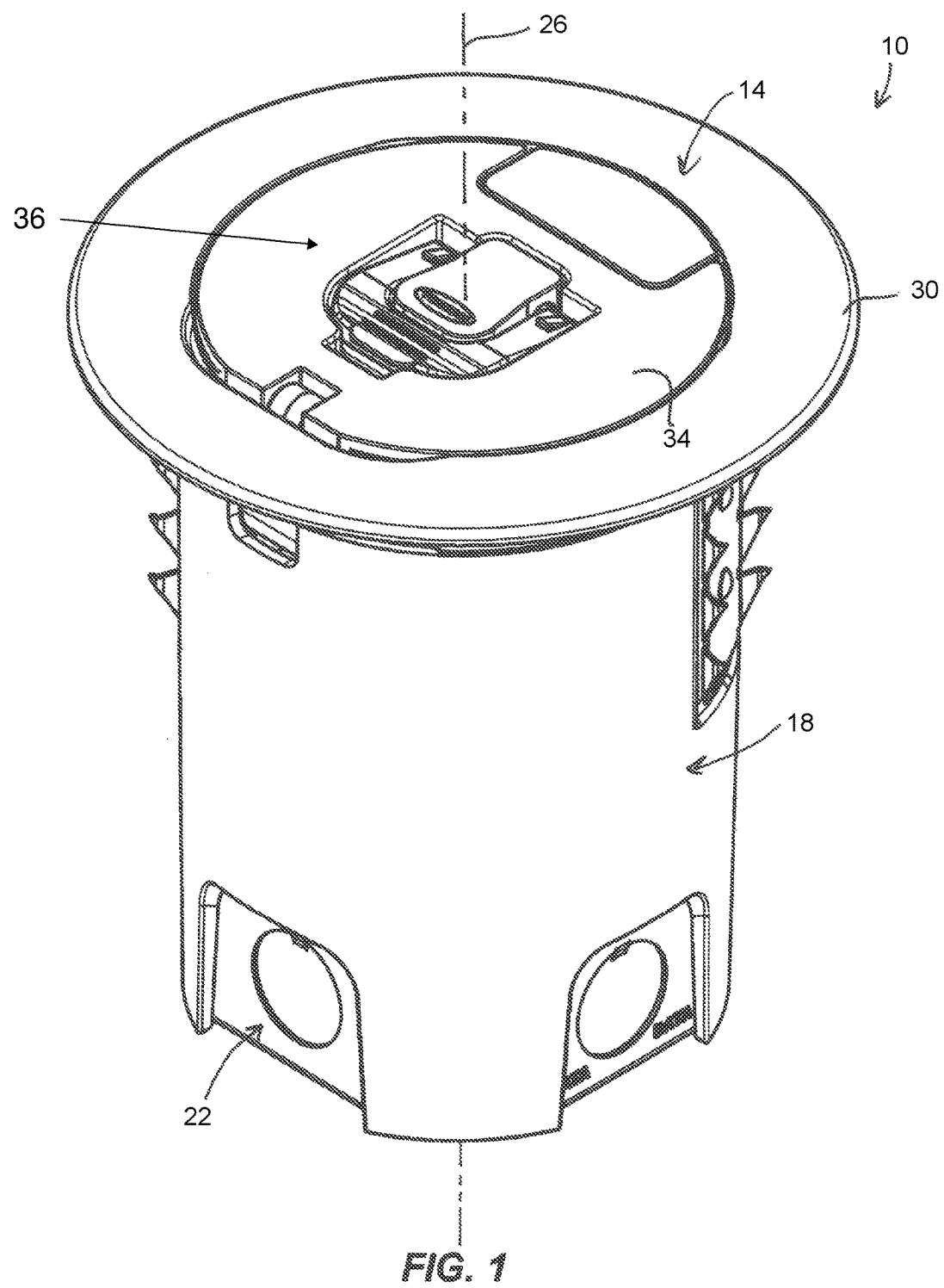
FIG. 1 is a perspective view of a floor box assembly.
Figure 2:
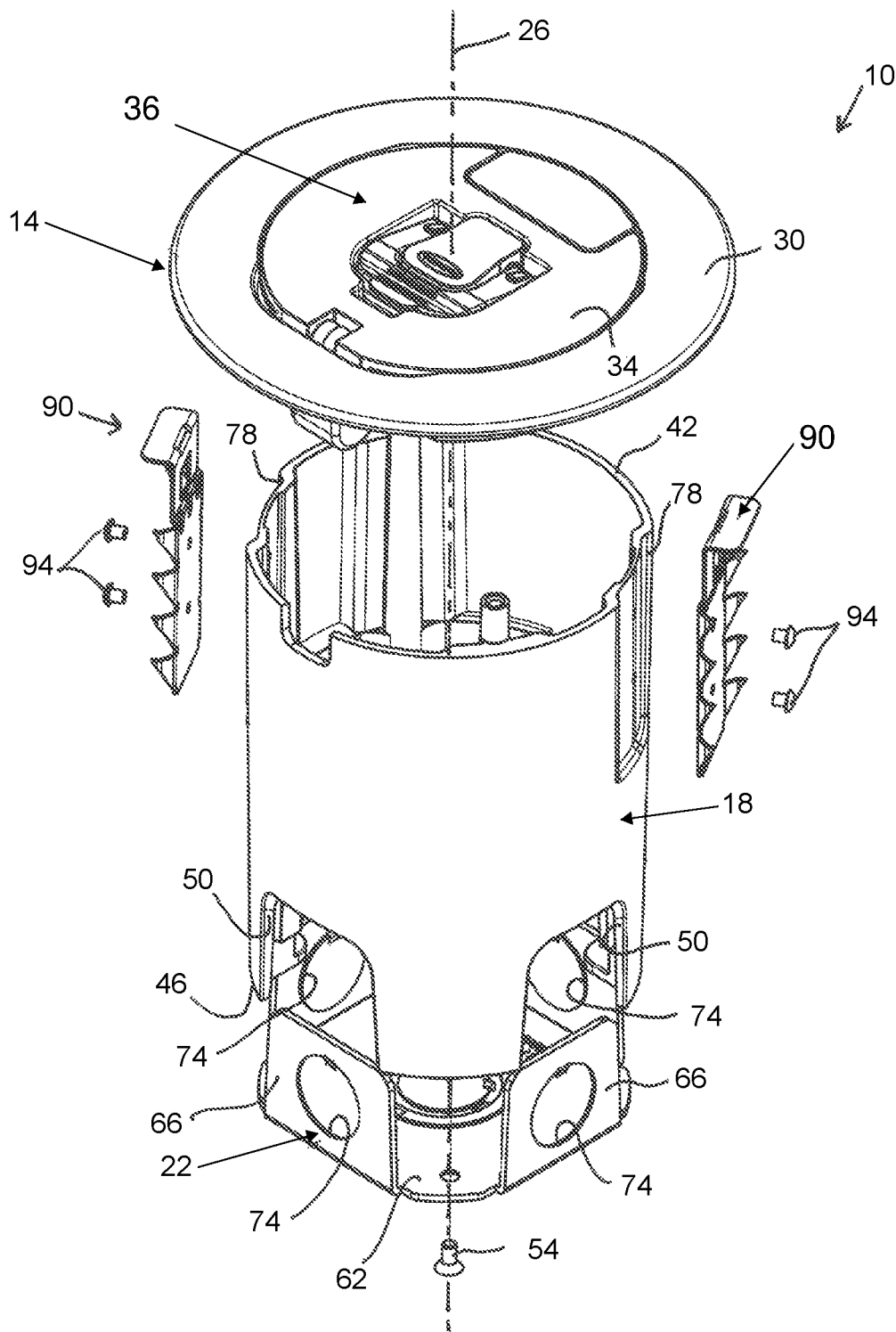
FIG. 2 is an exploded view of the floor box assembly of FIG. 1.
Figure 3:
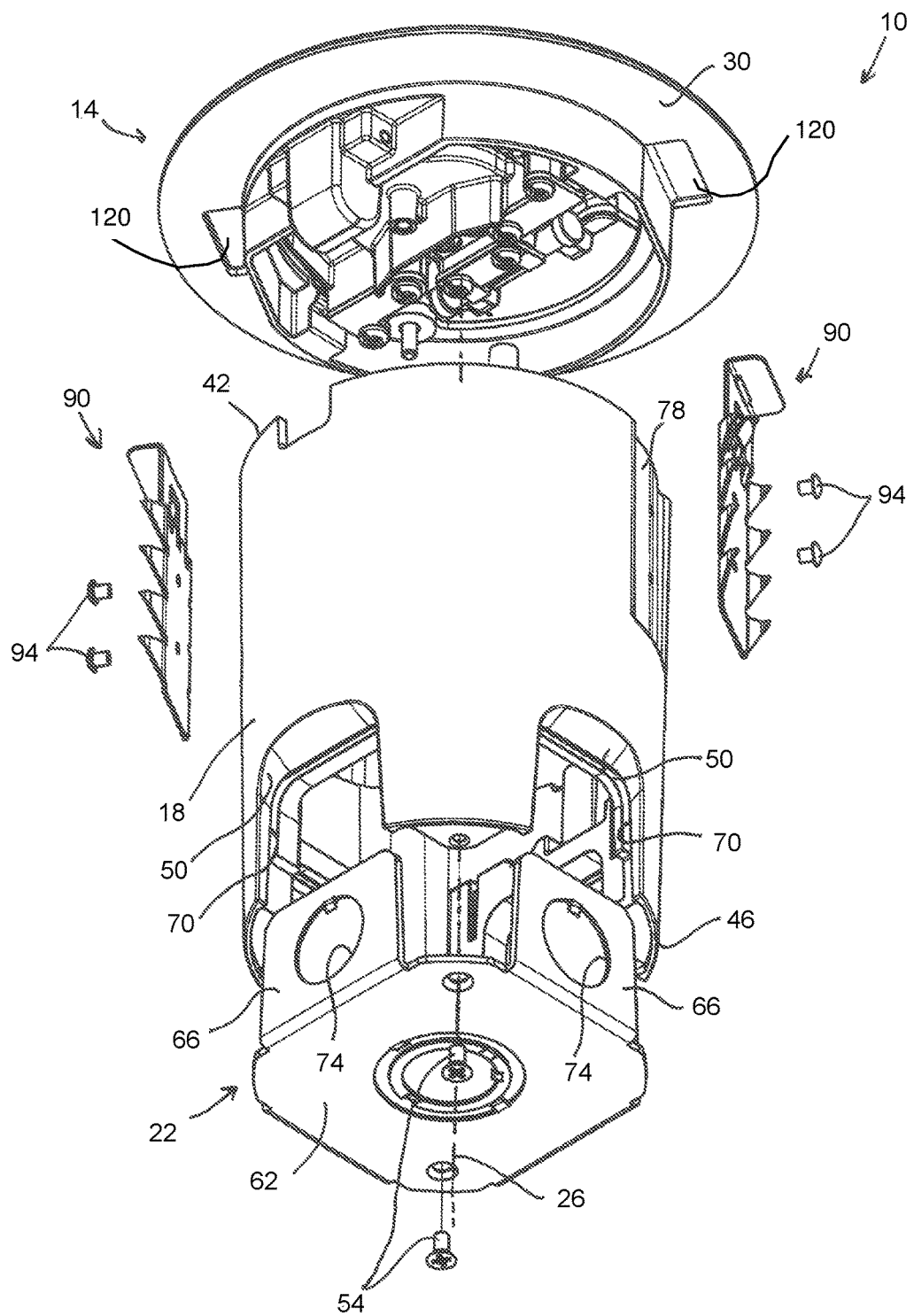
FIG. 3 is a lower perspective exploded view of the floor box assembly of FIG. 1.

FIGS. 1-3 illustrate a floor box assembly 10 consistent with one or more exemplary embodiments. The floor box assembly 10 includes a cover 14, a riser or floor box 18, and a base 22. The cover 14, floor box 18, and base 22 are stacked together along a longitudinal axis 26. In one embodiment, the cover 14 includes an outer or peripheral portion 30 and a movable door 34. The door 34 may be secured in a closed position by a latch 36 (FIG. 1). The door 34 may be selectively opened to expose an electrical receptacle (not shown).

Figure 4:
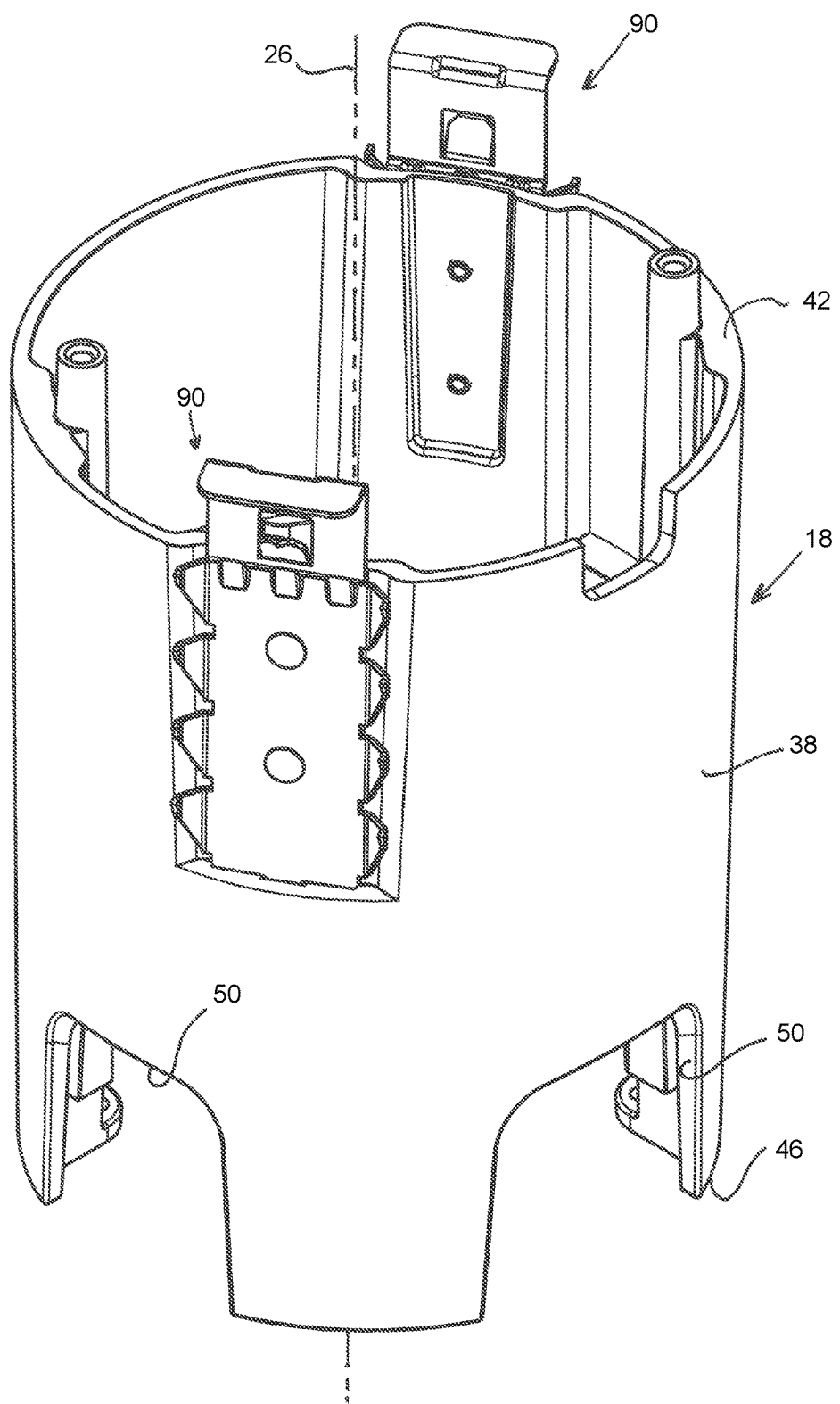
FIG. 4 is a perspective view of a floor box and a retention mechanism.

As shown in FIG. 4, the floor box 18 has a generally cylindrical outer wall 38 and includes a first or upper end 42 and a second or lower end 46. In the illustrated embodiment, the floor box 18 extends along the longitudinal axis 26. The upper end 42 includes an opening for receiving the cover 14. The lower end 46 includes cutouts 50. Referring to FIGS. 2 and 3, the base 22 is coupled to the lower end 46 (e.g., by fasteners 54). In the illustrated embodiment, the base 22 is formed from sheet metal and includes a lower wall 62 and a plurality of upstanding walls or tabs 66 extending upwardly from the lower wall 62. Each tab 66 extends into the cutouts 50 in the outer wall 38 of the floor box 18. The edge of each tab 66 may be received in a groove 70 (FIG. 3) extending along at least a portion of the perimeter of each cutout 50. Each tab 66 includes an opening 74 for receiving a conduit, which may include power cable(s) and/or data cable(s).

Figure 5:
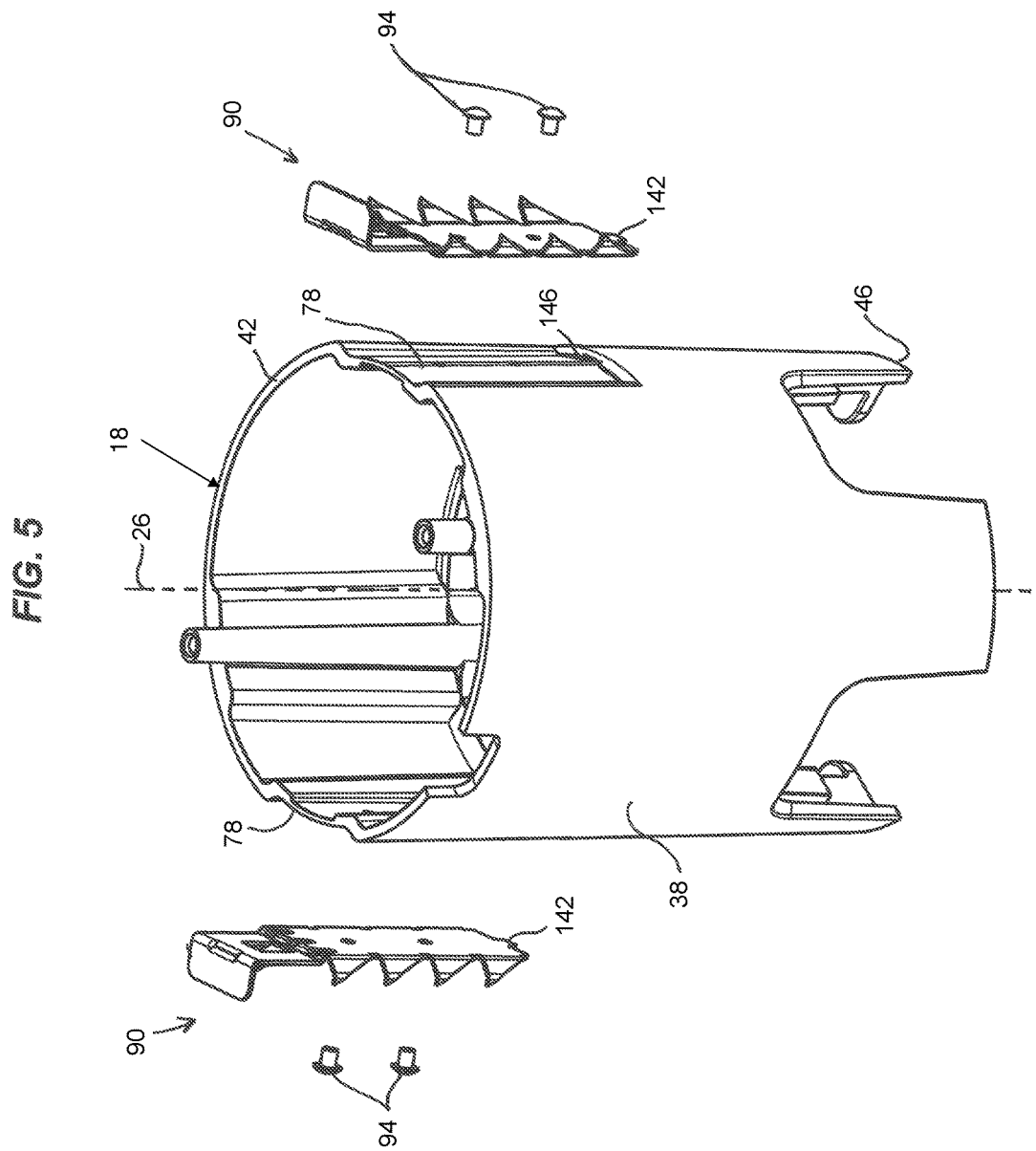
FIG. 5 is an exploded perspective view of the floor box and retention mechanism of FIG. 4.

Referring to FIG. 5, the floor box 18 further includes longitudinal recesses 78 formed in the outer wall 38. The recesses 78 are elongated and oriented in a direction that is substantially parallel to the longitudinal axis 26. In the illustrated embodiment, two recesses 78 are formed on an outer surface of the outer wall 38 and positioned 180 degrees apart from one another relative to the longitudinal axis 26. Stated another way, the recesses 78 are positioned on opposite sides of the longitudinal axis 26. In other embodiments, the fewer or more recesses 78 may be formed on the wall 38, and the recesses 78 may be spaced apart from one another at an angle less than 180 degrees.

As shown in FIGS. 4 and 5, the floor box assembly 10 further includes locking mechanisms or retainers 90 coupled to the outer wall 38. In the illustrated embodiment, each retainer 90 is positioned within one of the recesses 78. As discussed above, although two retainers 90 are illustrated in FIGS. 1 through 5, fewer or more retainers 90 may be secured to the outer wall 38. As shown in FIG. 5, each retainer 90 may be secured within the recess 78 by fasteners 94. In other embodiments, a single retainer may be wrapped around a perimeter of the outer wall 38. The retainer 90 may also be captured or secured to the floor box 18 in a different manner.

Figure 6:
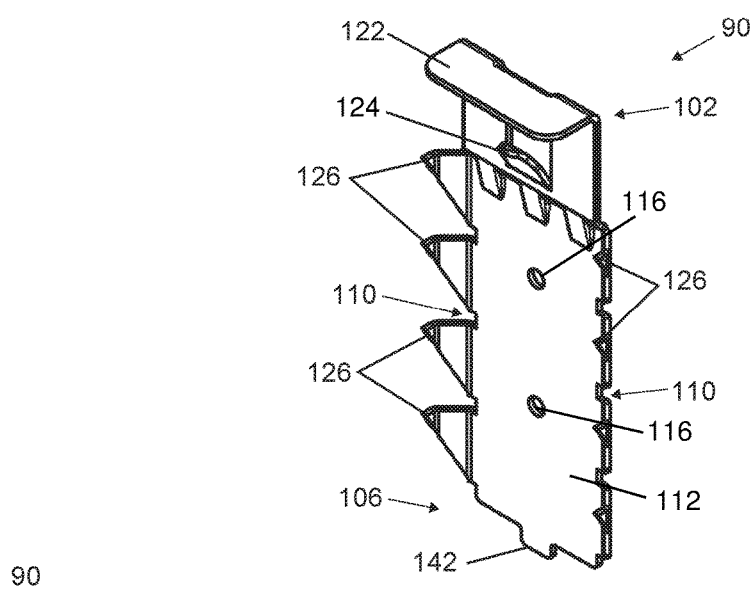
FIG. 6 is a perspective view of the retention mechanism of FIG. 4.
Figure 7:
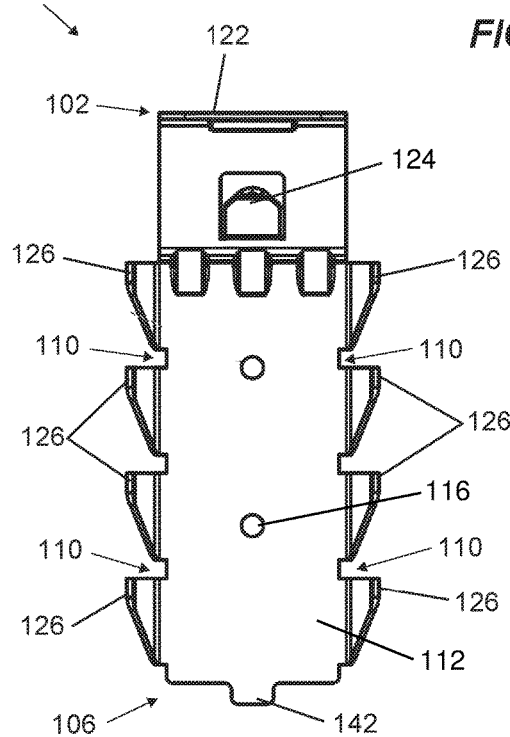
FIG. 7 is a front view of the retention mechanism of FIG. 6.
Figure 8:
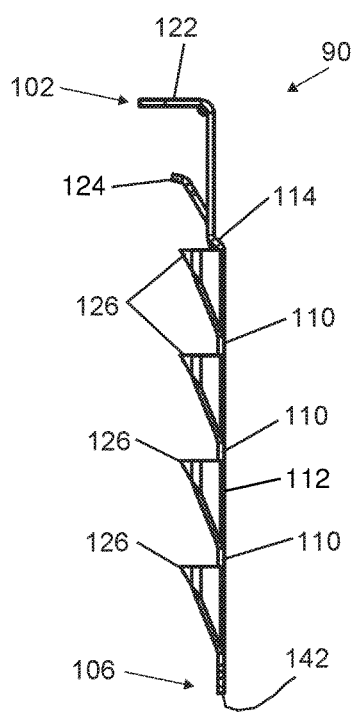
FIG. 8 is a side view of the retention mechanism of FIG. 6.

Referring to FIGS. 6-8, in the illustrated embodiment the retainer 90 is formed as a bracket including a first or upper end 102, a second or lower end 106, and a pair of side edges 110 extending between the upper end 102 and the lower end 106. The retainer 90 includes a generally planar body 112 and a step 114 (FIG. 8) such that a portion proximate the upper end 102 is offset from the plane of the body 112. In addition, the body 112 may include holes 116 for receiving the fasteners 94 (FIG. 5).

Each retainer 90 further includes a flange or projection 122 positioned at the upper end 102. The projection 122 may extend in a direction perpendicular to the plane of the body 112, outwardly away from the axis 26 of the floor box 18. In the illustrated embodiment, each projection 122 is positioned in a pocket or groove 120 (FIG. 3) formed in a lower surface of the peripheral portion 30 of the cover 14. In addition, a finger 124 extends in a direction away from the body 112 and oriented at an angle. One end of the finger 124 is connected to the retainer 90 proximate the step 114, while another end is spaced apart from the plane of the body 112 and is positioned proximate the projection 122. The finger 124 may engage a floor material (e.g., tile, panel—not shown) when the floor box assembly 10 is installed in a floor to prevent the floor box assembly 10 from being lifted out of the floor.

Each retainer 90 further includes a plurality of barbs 126 positioned along the side edges 110 of the retainer 90. Each barb 126 is tapered such that a portion of the barb 126 proximate the lower end 106 of the retainer 90 protrudes from the plane of the body 112 less than a portion of the barb 126 positioned proximate the upper end 102. In one embodiment, each barb 126 may incorporate a linear taper; in other embodiments, one or more barbs 126 may incorporate a taper having a different shape.

In the illustrated embodiment, the retainer 90 includes four barbs 126 protruding outwardly from the plane of the body 112 and are arranged linearly and vertically along each side edge 110. The barbs 126 extend outwardly from the retainer 90 along a profile that is partially arcuate. In other embodiments, the retainer 90 may include fewer or more barbs 126, and the barbs 126 may extend outwardly from the retainer 90 in another direction. In addition, the retainer 90 may include fewer or more columns of barbs 126 compared to the two columns in the illustrated embodiment.

As shown in FIGS. 6-8, the retainer 90 further includes a tab 142 positioned adjacent the lower end 106. The tab 142 is configured to be inserted into a slot 146 (FIG. 5) on the outer wall 38 of the floor box 18, adjacent the recess 78. The tab 142 aligns the retainer 90 with the recess 78.

The floor box assembly 10 may be inserted into a hole in a floor (not shown) or other support surface. The tapered shape of each barb 126 allows the floor box assembly 10 to be inserted into the hole, but positively engages the surrounding surface to prevent the floor box 18 or the rest of the assembly 10 from being removed from the hole. Because the retainers 90 include barbs 126 at multiple positions along the height of each retainer 90, the barbs 126 are capable of engaging floors or support surfaces in a range of thicknesses. The retainer 90 may be used with a variety of materials, such as wood, tile, or concrete. In addition, the projections 122 provide a stop surface to engage the edge of the hole and prevent the floor box assembly 10 from being inserted too far into the hole. Each retainer 90 may be formed from sheet metal to provide flexibility and durability to the structure of the retainer 90.

It would be understood that a device or method incorporating any of the additional or alternative details mentioned above would fall within the scope of the disclosure as determined based upon the claims below and any equivalents thereof.

Other aspects, objects and advantages of the disclosure can be obtained from a study of the drawings, the disclosure and the appended claims. Although certain embodiments have been described in detail, variations and modifications exist within the scope and spirit of one or more independent aspects as described.

What is claimed is:

1. A floor box assembly comprising:
   a floor box including an outer wall extending along a longitudinal axis, the outer wall including a first end and a second end, the first end configured to be coupled to an electrical receptacle, the floor box configured to receive at least one cable in electrical communication with the receptacle; and
   at least one retainer coupled to the floor box and including a plurality of barbs, each of the barbs protruding outwardly relative to the outer wall, the retainer permitting the floor box to be inserted into a hole of a surface in a first direction along the longitudinal axis and securing the floor box against movement in a second direction opposite the first direction.

2. The floor box assembly of claim 1, further comprising a cover coupled to the first end of the floor box.

3. The floor box assembly of claim 1, wherein the outer wall includes a cylindrical portion extending at least partially between the first end and the second end, wherein each retainer is secured to an outer surface of the outer wall.

4. The floor box assembly of claim 1, wherein the outer wall includes at least one recess extending parallel to the longitudinal axis, the retainer secured to the outer wall and positioned within the recess.

5. The floor box assembly of claim 1, wherein the retainer includes a first end and a second end, wherein the first end includes a projection extending at an angle away from the longitudinal axis.

6. The floor box assembly of claim 1, wherein the retainer includes a body, wherein each barb includes a portion extending outwardly relative to the outer wall at a first end, and a second end proximate the body, and wherein each barb tapers from the portion toward the second end.

7. The floor box assembly of claim 1, wherein the barbs are aligned along a line parallel to the longitudinal axis.

8. The floor box assembly of claim 1, wherein the barbs include a first set of barbs and a second set of barbs laterally spaced apart from the first set of barbs.

9. The floor box assembly of claim 1, wherein the outer wall of the floor box includes a slot, wherein each retainer includes a tab positioned adjacent an end of the retainer, the tab received within the slot.

10. The floor box assembly of claim 1, wherein the retainer includes a pair of retainers, the retainers coupled to the outer wall and spaced apart from one another by 180 degrees.

11. A floor box assembly comprising:
a floor box including an outer wall extending along a longitudinal axis, the outer wall defining a first end and a second end, the first end configured to be coupled to an electrical receptacle, the floor box configured to receive at least one cable in electrical communication with the receptacle;
a first retainer positioned on the outer wall, the first retainer including a first barb extending outwardly relative to the longitudinal axis; and
a second retainer spaced apart from the first retainer on the outer wall, the second retainer including a second barb extending outwardly relative to the longitudinal axis.

12. The floor box assembly of claim 11, wherein the outer wall includes a first recess and a second recess, the first retainer positioned within the first recess and the second retainer positioned within the second recess.

13. The floor box assembly of claim 11, wherein each retainer includes a first end positioned proximate the first end of the floor box and a second end positioned proximate the second end of the floor box, wherein the first end includes a projection extending at an angle away from the longitudinal axis.

14. The floor box assembly of claim 11, wherein each retainer includes a body, and wherein each barb tapers from a portion extending outwardly relative to the longitudinal axis to the body.

15. The floor box assembly of claim 11, wherein the first retainer includes a plurality of first barbs aligned along a line parallel to the longitudinal axis, wherein the second retainer includes a plurality of second barbs aligned along a line parallel to the longitudinal axis.

16. The floor box assembly of claim 11, wherein the first retainer includes a pair of first barbs laterally offset from one another, wherein the second retainer includes a pair of second barbs laterally offset from one another.

17. The floor box assembly of claim 11, wherein the outer wall includes a first recess and a second recess, and wherein the first recess and the second recess are spaced apart by 180 degrees about the longitudinal axis.

18. The floor box assembly of claim 11, wherein each retainer includes a projection positioned proximate the first end of the floor box, the projection extending perpendicularly relative to the longitudinal axis.

19. The floor box assembly of claim 11, wherein each retainer includes a body having a first end and a second end, and wherein each barb is coupled to the body between the first end and the second end along a line parallel to the longitudinal axis.

20. A method of installing a floor box assembly, the method comprising:
providing a floor box having an outer wall and a retainer secured to the outer wall, the retainer including a plurality of tapered barbs, at least some of the plurality of barbs aligned along an axis; and
inserting the floor box and retainer into a hole of a surface in a first direction parallel to the axis such that the barbs engage a perimeter of the hole to secure the floor box against movement in a second direction opposite the first direction.

* * * * *